US011361064B2

(12) United States Patent
Naganna et al.

(10) Patent No.: US 11,361,064 B2
(45) Date of Patent: Jun. 14, 2022

(54) ACCESS LEVEL AUTHENTICATION BASED ON FIELD OF VIEW SEGMENTATION

(71) Applicant: International Business Machines Corporation, Armonk, NY (US)

(72) Inventors: Soma Shekar Naganna, Bangalore (IN); Sarbajit K. Rakshit, Kolkata (IN); Abhishek Seth, Deoband (IN); Venkata JayaPrakash Jinka, Kadapa (IN)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 16/868,857

(22) Filed: May 7, 2020

(65) Prior Publication Data
US 2021/0349983 A1    Nov. 11, 2021

(51) Int. Cl.
| | |
|---|---|
| *G06F 21/00* | (2013.01) |
| *G06F 21/35* | (2013.01) |
| *G02C 11/00* | (2006.01) |
| *G02B 27/01* | (2006.01) |
| *G06V 10/22* | (2022.01) |
| *G16Y 30/10* | (2020.01) |
| *G02C 7/04* | (2006.01) |

(52) U.S. Cl.
CPC ......... *G06F 21/35* (2013.01); *G02B 27/0172* (2013.01); *G02C 11/10* (2013.01); *G06V 10/22* (2022.01); *G02B 2027/0138* (2013.01); *G02C 7/04* (2013.01); *G06F 2221/2113* (2013.01); *G16Y 30/10* (2020.01)

(58) Field of Classification Search
None
See application file for complete search history.

(56) References Cited

U.S. PATENT DOCUMENTS

| | | |
|---|---|---|
| 9,170,646 B2 | 10/2015 | Toner |
| 10,330,957 B2 | 6/2019 | Boss |
| 10,956,544 B1 * | 3/2021 | Knas ................... G06V 40/172 |

(Continued)

OTHER PUBLICATIONS

"7 Exciting Developments in the World of Augmented Reality Contacts", Copyright© 2020 perfectlens, 9 pps., <https://www.perfectlens.ca/articles/7-exciting-developments-augmented-reality-contacts>.

(Continued)

*Primary Examiner* — Martin Mushambo
(74) *Attorney, Agent, or Firm* — David K. Mattheis; Maeve Carpenter (57) ABSTRACT

A method provides for a field of view (FOV) of a smart contact lens of a user, such that the FOV includes a plurality of segments of the FOV. A device is identified from object recognition performed on image data from the smart contact lens and viewed within a first segment of the FOV. A key is transmitted to the device that includes credentials of the user of the smart contact lens to authenticate the user to the device that is viewed within the first segment of the FOV. A first level of access to the device is provided, based on viewing the device in the first segment of the FOV, and in response to changing the viewing of the device to a second segment of the FOV, providing a second level of access to the device associated with viewing the device in the second segment of the FOV.

20 Claims, 4 Drawing Sheets

(56) References Cited

U.S. PATENT DOCUMENTS

2019/0250432 A1    8/2019  Kim
2020/0026097 A1    1/2020  Pinel

OTHER PUBLICATIONS

"Peripheral vision", From Wikipedia, the free encyclopedia, last edited on Apr. 16, 2020, 8 pps., <https://en.wikipedia.org/wiki/Peripheral_vision>.

"Vector—Ergonomics of optimal angle view. Human sight range and distance.. Correct sitting and standing angle when using a computer. Vector poster for web or print design", © Apr. 30, 2020 123RF Limited 2005-2020, 24 pps., <https://www.123rf.com/photo_104495213_stock-vector-ergonomics-of-optimal-angle-view-human-sight-range-and-distance-correct-sitting-and-standing-angle-w.html>.

Elgan, "Why a smart contact lens is the ultimate wearable", Contributing Columnist, Computerworld, May 9, 2016, 9 pps., <https://www.computerworld.com/article/3066870/why-a-smart-contact-lens-is-the-ultimate-wearable.html>.

Edwards, "Sony smart contact lens will record everything you see, with the blink of an eye", Pocket-lint, May 5, 2016, 6 pps., <https://www.pocket-lint.com/ar-vr/news/sony/137527-sony-smart-contact-lens-will-record-everything-you-see-with-the-blink-of-an-eye>.

Sherr, "You've heard of AR glasses, but this startup wants to make them into contact lenses", Nov. 14, 2018, CNET, 6 pps., <https://www.cnet.com/news/youve-heard-of-ar-glasses-but-this-startup-wants-to-make-them-into-contact-lenses/>.

Shiel, Jr., "Medical Definition of Peripheral vision", © 1996-2020 WebMD, LLC, 86 pps., <https://www.medicinenet.com/script/main/art.asp?articlekey=10638>.

* cited by examiner

FIG. 4 ional input of information identifying the user, such as user identification and passcodes. In some cases, attempts to improve the efficiency of authentication activity includes the use of swiping, inserting, or use of near field connection (NFC) technology with smart cards to transmit authentication credentials.

ACCESS LEVEL AUTHENTICATION BASED ON FIELD OF VIEW SEGMENTATION

FIELD OF THE INVENTION

The present invention relates generally to the field of authentication to electronic devices, and more particularly to establishing a predetermined level of access to a device based on viewing the device within a segment region of a field of view as seen through a smart contact lens.

BACKGROUND OF THE INVENTION

Electronic devices that are connected through networks or the Internet often require authentication of a user to access and operate the devices or use features or functions available from the devices. Authentication often involves manual input of information identifying the user, such as user identification and passcodes. In some cases, attempts to improve the efficiency of authentication activity includes the use of swiping, inserting, or use of near field connection (NFC) technology with smart cards to transmit authentication credentials.

Miniaturization of computer-based technology can be found in a variety of user devices and accessories. Recent advancements include electronic functions embedded within contact lenses that are worn by a user and can capture images of a user's view. Additionally, advancement in augmented reality devices includes augmented reality features in contact lenses worn by users, in which augmented images can be added to the user's view through the contact lenses.

SUMMARY

Embodiments of the present invention disclose a method, computer program product, and system. The embodiments include a method to authenticate a user with a device. The method provides for one or more processors to receive a field of view (FOV) of a smart contact lens of a user, such that the smart contact lens is configured to define a plurality of segments of the FOV. The one or more processors identify a device, based on performing object recognition techniques, in which the device is viewed within a first segment of the FOV of the smart contact lens. The one or more processors transmit a key to the device that includes credentials of the user of the smart contact lens that authenticate the user to the device that is viewed within the first segment of the FOV of the smart contact lens. The one or more processors receive a first level of access to the device, based on the device being viewed within the first segment of the FOV of the smart contact lens, and in response to a changing of a viewing of the device to a second segment of the FOV of the smart contact lens and transmitting the key including the credentials of the user to the device, the one or more processors receive a second level of access to the device, based on the changing of the viewing of the device to the second segment of the FOV.

DETAILED DESCRIPTION

Embodiments of the present invention recognize that users may interact with a plurality of connected and interconnected electronic devices that require authentication of the user prior to access or operation of a device, or prior to access to a function, feature, or application included on the device. Authentication activity directed to multiple devices operating within a short period of time or simultaneously by a user creates disruption, consumes otherwise productive time, and involves logistics of maintaining identifications, passcodes, smart cards or other items to authenticate. In some cases, authentication includes privileges for a user that inadvertently may result in privileged changes being made when only normal activity was required, due to the single level of access granted by the authentication.

Embodiments of the present invention provide a method, computer program product, and computer system for a user of smart contact lenses to authenticate with a device by locating the device within a segment of the user's field of view (FOV) as viewed through the smart contact lenses. Additionally, the authentication of the user is associated with a level of access based on the specific segment of the field of view in which the device is viewed through the smart contact lenses. Embodiments of the present invention enable authentication with a device and receipt of an access level without requiring manual activity for individual devices. The authentication is performed by the user of smart contact lenses merely locating or viewing a device (or devices) within a particular segment of the user's FOV as seen through the smart contact lenses. In embodiments of the present invention, one smart contact lens or a pair of smart contact lenses may be in operation by a user. For convenience and simplicity, discussion and examples hereafter refer to the use of a pair of smart contact lenses; however, embodiments of the invention are not limited by the use of a single smart contact lens.

In embodiments of the present invention, a FOV through the smart contact lenses of the user includes a plurality of segments, and the FOV also includes both horizontal and vertical components. In some embodiments, horizontal components of segments of the FOV include a far-left segment in which the right eye cannot view objects in the segment; a left peripheral segment, a central focus segment, a right peripheral segment, and a far-right segment not visible to the left eye. In some embodiments, the vertical segments include a top or upper segment, a central segment, and a lower segment. In some embodiments, a particular segment region, composed of a combination of horizontal and vertical segments, is associated with authenticating the user to a device that is viewed within the particular segment region, and providing a level of access corresponding to viewing the device within the particular segment region. In some embodiments, as the device is viewed in a different segment region, authentication with the device results in a different access level of the user to the device. For example, viewing a smartphone in a left peripheral-central-vertical segment authenticates the user to the smartphone and provides read-only access to the screen of the smartphone, whereas viewing the smartphone in the central focus-central vertical segment authenticates the user to the smartphone with a read-write access level.

In some embodiments of the present invention, the smart contact lenses are configured with augmented reality functionality and can overlay segment boundary lines or a three-dimensional object within the FOV of the user. The overlaid segment boundary lines server to enable the user of the smart contact lenses to adjust the FOV such that a device or devices are viewed within a particular segment as indicated by the overlaid boundaries. In some embodiments, one or more augmented reality objects may be included as an overlay within the FOV of the smart contact lenses. The augmented reality object may be used to align a device within the viewed region of the augmented object to establish authentication with the device and receive a specific level of access, for example, an administrator or privileged access to the device. In some embodiments, the three-dimensional augmented object or region within the FOV may occupy a portion of a segment or extend across segments and may be positioned further away or closer to the user. In embodiments of the present invention, some actions and operations associated with authentication with a device are performed by particular eye activity or movements, such as rapid blinking or repeated rapid eye movements.

Figure 1:
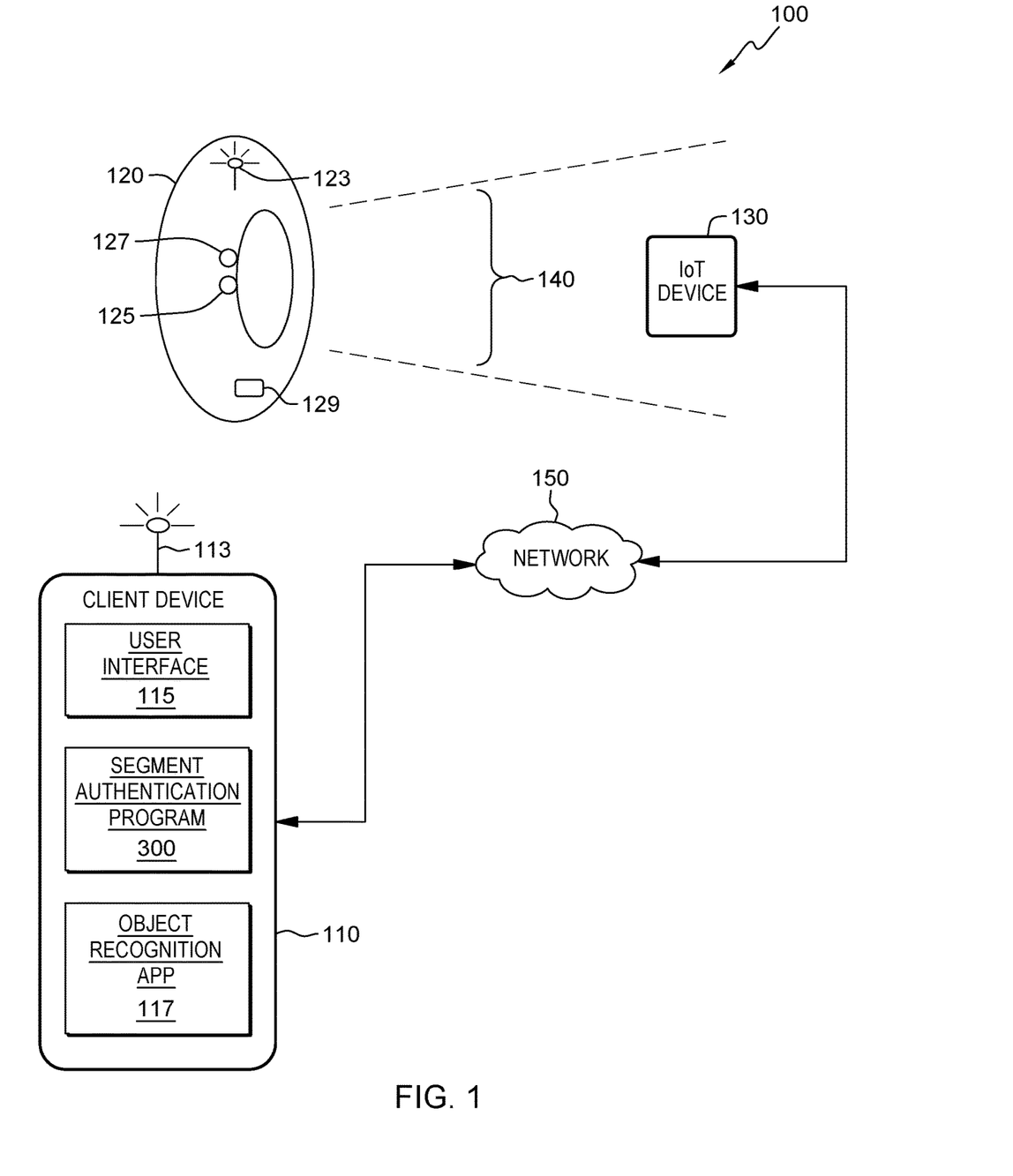
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client device 110, smart contact lenses 120, and IoT device 130, all interconnected via network 150, as well as FOV 140. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communications between client device 110, smart contact lenses 120, and IoT device 130, in accordance with embodiments of the present invention.

Client device 110 is a mobile computing device operated by the user of smart contact lenses 120. Client device 110 includes wireless transceiver 113, user interface 115, object recognition application (app) 117, and segment authentication program 300. In some embodiments, client device 110 communicates with smart contact lenses 120 via wireless transceiver 113 using near-range wireless technology, such as a Bluetooth connection, NFC connection, a personal-area network, or other near-range wireless technology. In other embodiments, client device 110 communicates to smart contact lenses 120 via network 150. Client device 110 communicates with IoT device 130 through network 150.

In some embodiments of the present invention, client device 110 may be a laptop computer, a tablet computer, a smartphone, smartwatch, a smart speaker, a wearable computing device, or any programmable electronic device capable of communicating with various components and devices within distributed data processing environment 100, via network 150. In general, client device 110 represents one or more programmable electronic devices or a combination of programmable electronic devices capable of executing machine-readable program instructions and communicating with other computing devices (not shown) within distributed data processing environment 100 via a network, such as network 150. Client device 110 may include internal and external hardware components, depicted in more detail in FIG. 4.

User interface 115 provides an interface to access the features and functions of client device 110. In some embodiments of the present invention, user interface 115 provides access to segment authentication program 300. User interface 115 may also support access to other applications, features, and functions of client device 110 (not shown), such as onboarding and off-boarding client device 110 from the network to access protected resources. In some embodiments, user interface 115 provides display output and input functions for client device 110.

User interface 115 supports access to alerts, notifications, and provides forms of communications. In one embodiment, user interface 115 may be a graphical user interface (GUI) or web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also include mobile application software that provides respective interfaces to features and functions of client device 110. User interface 115 enables respective users of client device 110 to receive, view, hear, and respond to input, access applications, display content of online conversational exchanges, and perform available functions.

Object recognition app 117 is depicted as operating on client device 110. Object recognition app 117 receives digital image data from camera 125 wirelessly transmitted from smart contact lenses 120 via wireless transceiver 123 and received by wireless transceiver 113 of client device 110. Object recognition app 117 applies object recognition techniques to the received digital images to identify devices with which to automatically authenticate via segment authentication program 300. Segment authentication program 300 works in conjunction with augmented reality projector 127 to determine a segment and/or a three-dimensional object augmented within FOV 140, and identifies Internet of Things (IoT) devices, such as IoT device 130, by applying object recognition app 117. Segment authentication program 300 applies the appropriate access level associated with the authentication of the user of smart contact lenses 120 with the IoT device, by determination of the segment or three-dimensional object position of the IoT device within FOV 140.

Segment authentication program 300 is depicted as hosted on and operating from client device 110. Segment authentication program 300 interacts with object recognition app 117 of client device 110, as well as being communicatively connected to smart contact lenses 120 via client device 110.

Segment authentication program 300 receives optical data from camera 125 of smart contact lenses 120. In some embodiments, the optical data is image data taken at a predetermined interval of time. In other embodiments, the optical data received is a selection of video frames from camera 125. Segment authentication program 300 identifies devices within the FOV of smart contact lenses 120 and determines a segment or three-dimensional object in which a respective device is positioned relative to the FOV. Segment authentication program 300 authenticates with the device to establish an access level associated with the particular segment of the FOV in which the position of the respective device has been determined, based on the determined segment in which the respective device is positioned within the FOV.

In some embodiments, as FOV 140 of smart contact lenses 120 changes, the respective device, such as IoT device 130, changes position relative to the segments within FOV 140. As a result of FOV 140 changing, segment authentication program 300 determines that IoT device 130 may be positioned in a different segment of FOV 140. Segment authentication program 300 detects the position of IoT device 130 as changed to a different segment within FOV 140 and changes the access level associated with the authentication of the user of smart contact lenses 120 to align with the access level associated with the different segment in which IoT device 130 is now viewed. In some embodiments, if segment authentication program 300 detects a device leaving a FOV of a first user and entering into the FOV of a second user, the device authentication automatically switches to the second user (based on a version of segment authentication program 300 aligned with a computing device of the second user), and the first user authentication is removed. In some embodiments, segment authentication program 300 includes a common authentication access level in which two or more users may simultaneously be authenticated with a device.

Smart contact lenses 120 is depicted as a single contact lens worn by a user that includes wireless transceiver 123, camera 125, augmented reality (AR) projector 127, and microprocessor 129. In some embodiments of the present invention, smart contact lenses 120 represents a single smart contact lens worn by the user. In some embodiments, camera 125 is configured to receive optical input of FOV 140. Camera 125 transmits image and/or video data as viewed in FOV 140 to client device 110 for object recognition of devices, such as IoT device 130, performed by object recognition application (app) 117. In embodiments of the present invention, a user of smart contact lenses 120 can choose to opt-in to utilize camera 125 and other features of smart contact lenses 120 for authentication of devices within the user's field of view. In some embodiments, the user may elect to opt-in for use of the camera and/or other functions of smart contact lenses 120 to authenticate an access level of devices within the user's field of view for specific time ranges, using the user interface 115 of client device 110 to configure and control functions of smart contact lenses 120.

AR projector 127 projects augmented images on the retina of the user, effectively adding augmented images in FOV 140 as viewed through smart contact lenses 120. In some embodiments, AR projector 127 projects images depicting segment boundaries within FOV 140. In some embodiments, AR projector 127 projects object images having a three-dimensional shape and defining a region within one or a combination of segments of FOV 140. In some embodiments, AR projector 127 may provide an indicator of recognized devices within FOV 140, enabling easy identification of the device and the location of the device in FOV 140, with respect to segments of FOV 140.

In some embodiments of the present invention, smart contact lenses 120 are powered by wireless power transmission sources. In other embodiments, smart contact lenses 120 include a rechargeable battery as a source of power (not shown). Smart contact lenses 120 includes wireless transceiver 123, which enables the communication between smart contact lenses 120 and client device 110 via wireless transceiver 113. Smart contact lenses 120 communicates with segment authentication program 300 on client device 110 via wireless transceiver 123, which operates using a near-range wireless connection technology, such as Bluetooth or personal-area network technology, (Bluetooth is a registered trademark of Bluetooth Special Interest Group (SIG), Inc. in the United States and other countries worldwide).

In some embodiments, smart contact lenses 120 receives images and/or video data of FOV 140 by camera 125 and transmits the visual data via transceiver 123 to transceiver 113 of client device 110. Additionally, smart contact lenses 120 transmits the segment boundary data of FOV 140 to client device 110. The visual and segment boundary data received by client device 110 is processed by segment authentication program 300, which uses object recognition app 117 to identify devices within the visual data received, and segment authentication program 300 determines the relative position of the identified device(s) in FOV 140, with respect to the augmented segment boundaries and/or augmented objects of FOV 140.

Internet-of-Things (IoT) device 130 is a computer-enabled electronic device that is connected to a network, such as network 150. In some embodiments, IoT device 130 is wirelessly connected to network 150, and in some embodiments, the connection to network 150 includes a connection to the Internet. In some embodiments, IoT device 130 can be a laptop computer, a desktop computer, a tablet computer, an application installed on a computing device, a smartphone, a voice assistant, a smart printer, a smart TV, smart speakers, wearable computing devices, a camera device, such as a doorbell camera, a smart appliance, a security system, and a smart lock.

IoT device 130 interacts with segment authentication program 300 to perform an authentication function with a user prior to providing access, which may be read-only access, read-write access, access to applications or functions of IoT device 130, administrator or privileged access to set-up, change, delete, or modify settings and profile information of users. Embodiments of the present invention automatically perform an authentication function of a user of smart contact lenses 120 with IoT device 130 and, if successfully authenticated, provide an access level to the user that corresponds to the segment of FOV 140 in which IoT device 130 is viewed. In one embodiment, as IoT device 130 is viewed in different segments, or within a different three-dimensional augmented object of FOV 140, the access level of the user to IoT device 130 changes.

FOV 140 depicts the field of view as seen by the user of smart contact lenses 120 and is depicted as including IoT device 130 within FOV 140. FOV 140 includes augmentation segments that are overlaid on FOV 140 by AR projector 127 of smart contact lenses 120. The augmented segments divide FOV 140 into portions having a corresponding access level for authenticated users (discussed in more detail with respect to FIGS. 2A and 2B).

Figure 2A:
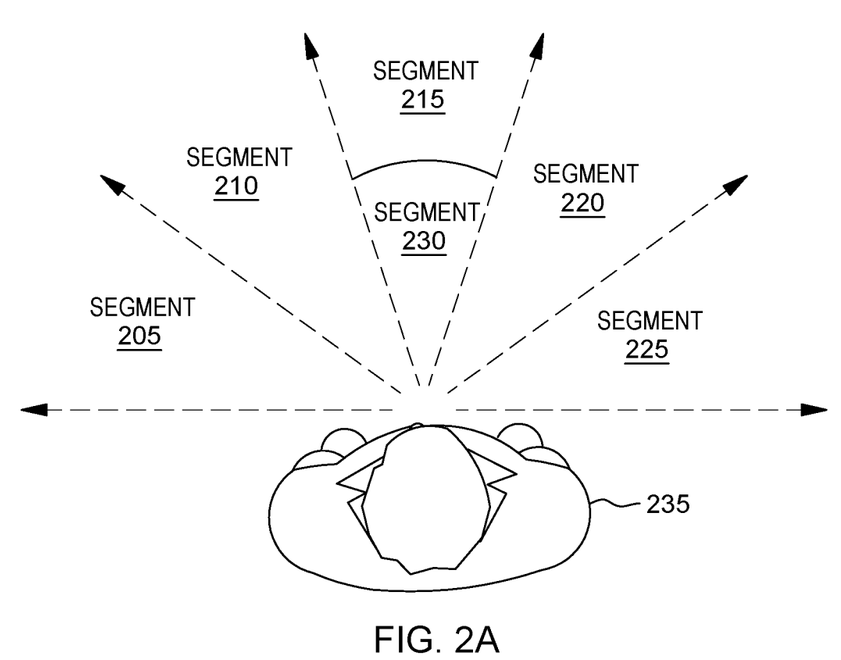
FIG. 2A is a diagram depicting horizontal segments of a field of view of a user as viewed through a smart contact lens, in accordance with embodiments of the present invention.

FIG. 2A is a diagram depicting horizontal segments of a field of view (FOV) of a user as viewed through smart contact lenses 120 (FIG. 1), in accordance with embodiments of the present invention. FIG. 2A includes a top-down view of user 235 and includes horizontal partitioning of segments 205, 210, 215, 220, 225, and 230. In some embodiments, augmentation by AR projector 127 of smart contact lenses 120 (FIG. 1) defines the segmentation of the FOV of user 235. In embodiments of the present invention, segment 205 is a far-left segment of the FOV and is not viewable by the right eye of user 235, and segment 225 is the far-right segment of the FOV and is not viewable by the left eye of user 235. In an example embodiment, devices that are positioned within segments 205 and 225 of the FOV of user 235 are not authenticated by segment authentication program 300, and the user is not granted an access level to devices viewed in segments 205 and 225.

In some embodiments of the present invention, devices viewed in segment 210 and segment 220 of the FOV of user 235 (wearing smart contact lenses 120 of FIG. 1) authenticate with user 235 via segment authentication program 300, which provides a predetermined access level to the devices viewed in segment 210 and segment 220. In some embodiments, devices viewed within segment 210 and segment 220 are provided a similar access level to the respective devices, such as "read-only" access. In other embodiments, segment 210 and segment 220 of the FOV of user 235 are associated with different access levels for devices viewed in the respective segments. For example, a device viewed in segment 210 of the FOV of user 235 is granted an access level of "read-only," whereas the same device, when viewed in segment 220, is provided and access level of "read-write".

Segment 215 of the FOV of user 235 is a center-focus segment. Segment 215 provides a predetermined access level of user 235 to devices viewed in segment 215. The predetermined access level is associated with the respective segment of the FOV of user 235. In some embodiments, a center-focus segment of a FOV includes a higher level of access to a device viewed in the center-focus segment, as compared to a segment outside of the center-focus area. For example, user 235 views a first device in segment 215 and a second device in segment 210 of the FOV. Segment authentication program 300 authenticates user 235 with the first device and the second device, providing "read-only" access to the device viewed in segment 210, while providing "read-write" access to the second device viewed in segment 215.

Segment 230 is depicted as a segment of the FOV of user 235 as viewed through smart contact lenses as described in discussions of FIG. 1 above. Segment 230 is within segment 215, but includes a distance attribute, such that segment 230 is at a distance closer to user 235, and segment 215 is at a distance further from user 235. In some embodiments of the present invention, authentication of user 235 with devices determined to be within segment 230 provides a specific or enhanced access level to user 235 with the device viewed within segment 230. For example, user 235 views a device within segment 230 and segment authentication program 300 authenticates user 235 with the device and, if successful, then provides an administrator access level to the device viewed in segment 230. In some embodiments, the access level to the device granted to user 235 is an access level to an application on the device. In other embodiments, the access level granted is access to features or functionality of the device, and may include access to one, some, or all features or functions.

Figure 2B:
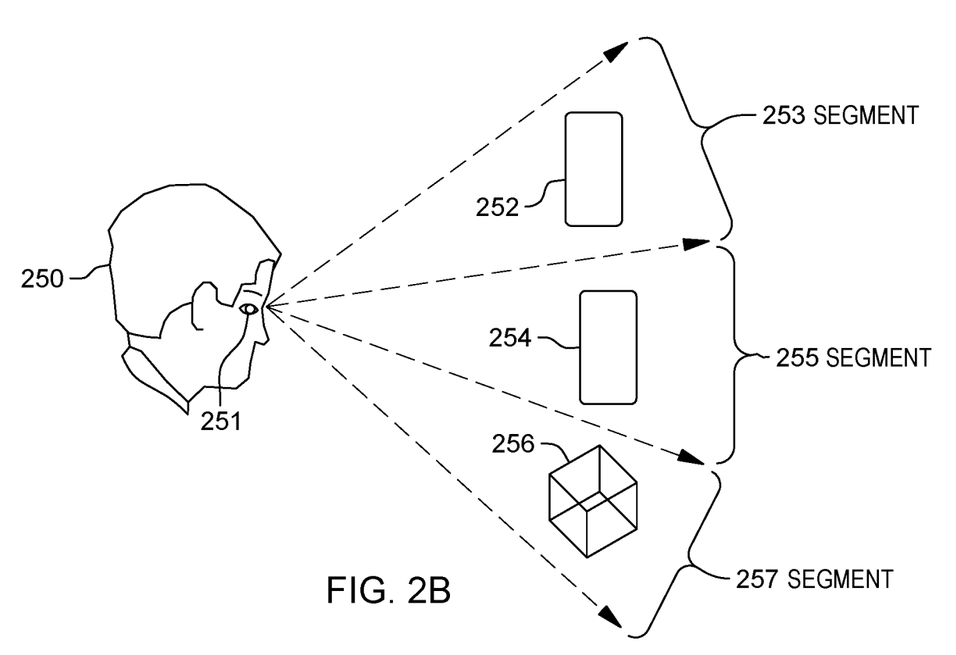
FIG. 2B is a diagram depicting vertical segments of a field of view of a user as viewed through the smart contact lens, in accordance with embodiments of the present invention.

FIG. 2B is a diagram depicting vertical segments of a FOV of user 250 as viewed through smart contact lenses 251, in accordance with embodiments of the present invention. Embodiments of the present invention recognize that the FOV of user 250 includes segments that extend in both horizontal and vertical directions and define segment regions within the FOV of user 250 as viewed through smart contact lenses 251. In some embodiments, the FOV of user 250 includes segment 253, which corresponds to an upper segment of the FOV, segment 255, which corresponds to a central segment of the FOV, and segment 257, which corresponds to a lower segment of the FOV.

FIG. 2B includes IoT device 252 and IoT device 254, and three-dimensional object region 256. IoT device 252 and IoT device 254 are detected as viewed in segment 253 and segment 255, respectively. In some embodiments, segment authentication program 300 authenticates user 250 with both IoT device 252 and IoT device 254 and assigns an access level of user 250 to each of the respective devices, associated with the respective segments (253, 255) in which the devices are viewed. For example, IoT device 252 is viewed in segment 253 of the FOV of user 250, and authentication of user 250 to IoT device 252 grants "read-only" access to displayed SMS messages of device 252. IoT device 254 is viewed simultaneously in segment 255 of the FOV of user 250 and segment authentication program 300 authenticates user 250 to IoT device 254 and grants "read-write" access to all functions of IoT device 254.

In some embodiments of the present invention, an access level of a device may be based on a combination of horizontal and vertical segments, such as far-left-upper segment and center-focus-lower segment. Embodiments associate an access level to a device viewed within a segment region of a user's FOV, subsequent to authentication of the user to the device, and the authentication and access level of the user to the device changes as the viewed position of the device changes within the FOV, as viewed through the smart contact lenses of the user.

Three-dimensional object region 256 is depicted as a subcomponent region within segment 257 of the FOV of user 250. In embodiments of the present invention, three-dimensional object region 256 is an augmented object overlaid to the FOV of user 250 by segment authentication program 300 working in conjunction with AR projector 127 of smart contact lenses 120. In some embodiments of the present invention, three-dimensional object region 256 may assume any three-dimensional shape and size and may be positioned within one or more segments of the FOV of user 250. In some embodiments, three-dimensional object region 256 is a transparent, augmented object and includes a specific level of access to authenticated user 250 for devices in the FOV that are positioned inside three-dimensional object region 256.

For example, IoT device 254 is viewed within segment 255 of the FOV of user 250 and segment authentication program 300 authenticates user 250 with IoT device 254 and grants "read-write" access to IoT device 254. Subsequently, user 250 shifts the FOV such that IoT device 254 is viewed within three-dimensional object region 256. Segment authentication program 300 authenticates user 250 with IoT device 254 and grants user 250 "administrator privileges," associated with three-dimensional object region 256, to IoT device 254.

Figure 3:
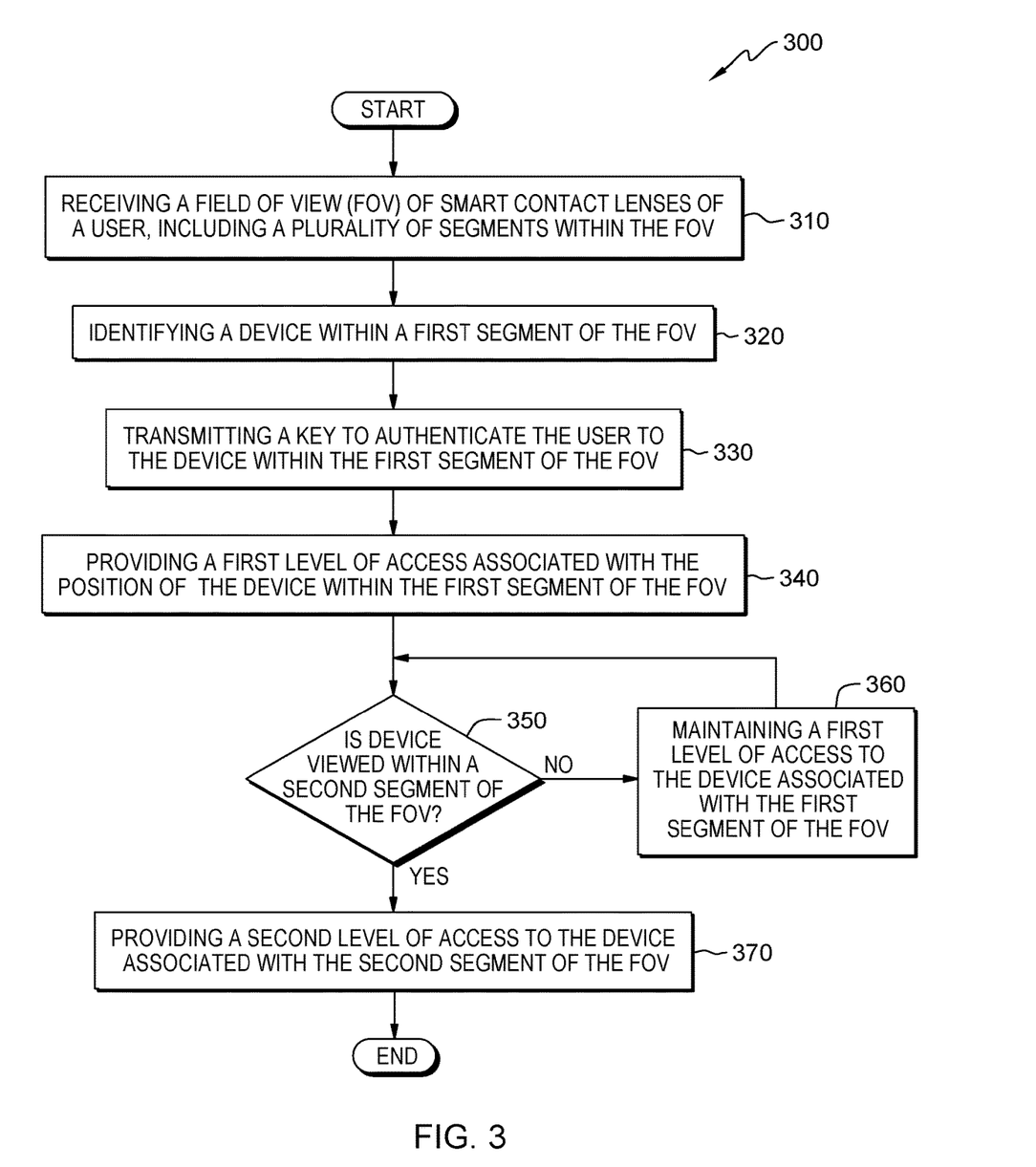
FIG. 3 is a flowchart depicting operational steps of a segment authentication program, operating in the distributed data processing environment of FIG. 1, in accordance with embodiments of the present invention.

FIG. 3 is a flowchart depicting operational steps of segment authentication program 300, operating in the distributed data processing environment of FIG. 1, in accordance with embodiments of the present invention. In some embodiments of the present invention, segment authentication program 300 includes configuration capability for defining segments of a FOV of a user wearing smart contact lenses and includes assigning an access level associated with devices viewed within a respective segment of the field of view of an authenticated user. In some embodiments, segment authentication program 300 includes configuration capability for an augmented three-dimensional object overlaid within one or more segments of the FOV.

Segment authentication program 300 receives a field of view (FOV) of smart contact lenses of a user, including a plurality of augmented reality segments within the FOV (step 310). A user of smart contact lenses generates a FOV including augmented reality boundaries overlaid on to the FOV. The FOV includes a device. A camera within the smart contact lenses collects optical image frames and transmits the image frames. Segment authentication program 300 receives the FOV that includes the device, based on object recognition techniques of a companion application, and determines the segment boundaries of a plurality of segments within the FOV. In some embodiments, the augmented reality segments within the FOV are detectable by segment authentication program 300, but are not readily visible to the user of the smart contact lenses; however, the user may display the augmented segment boundaries within the user's view by a predetermined eye activity, such as multiple rapid blinks.

In embodiments of the present invention, a user of smart contact lenses can choose to opt-in to utilize camera 125, AR projector 127, and other features of smart contact lenses 120 for authentication of devices within the user's field of view. In some embodiments, the user may elect to opt-in for use of the camera and/or other functions of smart contact lenses 120 to authenticate an access level of devices within the user's field of view for specific time ranges, using the user interface 115 of client device 110 to configure and control functions of smart contact lenses 120.

For example, a user of smart contact lenses 120 (FIG. 1) sees FOV 140, and camera 125 collects optical data image frames of FOV 140 and transmits the data via transceiver 123 to transceiver 113 of client device 110 on which segment authentication program 300 operates. Segment authentication program 300 receives the image frames of FOV 140 and generates a plurality of augmented reality (AR) segment boundaries overlaid on FOV 140 by AR projector 127 of smart contact lenses 120.

Segment authentication program 300 identifies a device within a first segment of the FOV (step 320). Segment authentication program 300, applying object recognition technology and techniques to the received FOV image frames, identifies a device within the FOV of the user and determines that the device is viewed at a position within a first segment of a plurality of segments within the FOV. In some embodiments of the present invention, segment authentication program 300 includes object recognition capability as a component module. In other embodiments, segment authentication program 300 sends image frames of the FOV to an object recognition application and receives data identifying devices within the image frames of the FOV. In other embodiments, devices within the FOV transmit an identifying signal received by the client device of the user hosting segment authentication program 300. For example, segment authentication program 300 receives data from object recognition app 117 identifying IoT device 130 within FOV 140. Segment authentication program 300 determines that IoT device 130 is within segment 210 (FIG. 2A) of the FOV.

Segment authentication program 300 transmits a key to authenticate the user to the device within the first segment of the FOV (step 330). Subsequent to identifying the device determined to be viewed in the first segment of the FOV, segment authentication program 300 transmits a key to the device to authenticate the client device of the user (hosting segment authentication program 300) with the device. In some embodiments, the key is unique to the user and the device and is determined by segment authentication program 300 subsequent to identifying the device within the FOV. In some embodiments, the key may be unique to the device and used by multiple users. In yet other embodiments, the key may be unique to the user and used by multiple devices. The key identifies the user to the device as part of an authentication process with the device and includes data indicating the device is viewed within the first segment of the FOV of the user.

For example, segment authentication program 300 sends a key to the device that includes a unique identifier associated with client device 110 of the user, via network 150. Segment authentication program 300 includes data indicating the device is viewed within segment 210 of the FOV of user 235 (FIG. 2A), along with the transmission of the key to IoT device 130.

Segment authentication program 300 provides a first level of access associated with the position of the device within the first segment of the FOV (step 340). Segment authentication program 300 determines the access level associated with viewing the device within the first segment of the FOV of the user wearing smart contact lenses. Segment authentication program 300 provides an access level to the device that is aligned with the position of the device within the segments of the FOV, such as a first segment. For example, segment authentication program 300 determines that the device is viewed within segment 210 of the FOV of user 235 and establishes an access level associated with the authentication of the computing device of user 235 with the device, based on the position of the device viewed within segment 210 of the FOV. The access level is associated with the device and the position of the device as viewed within the FOV of user 235.

Segment authentication program 300 determines whether the device is viewed within a second segment of the FOV (decision step 350). In some embodiments of the present invention, segment authentication program 300 continuously receives image frames of the FOV of the user of smart contact lenses to determine whether the relative position of a device or devices within the FOV changes with respect to the segments of the FOV. As the user's eye focus changes in a horizontal, vertical, or combination direction, the FOV, as well as the established segment boundaries of the FOV, is adjusted and changes with respect to objects and structures of the environment viewed within the FOV. As such, the relative position of stationary devices may appear to change position with respect to the adjusted FOV and segments within the adjusted FOV. Segment authentication program 300 determines whether an adjustment of the FOV results in the viewing of the device in a second segment of the FOV of the user.

For the case in which segment authentication program 300 determines that the device is not viewed in a second segment of the FOV (step 350, "NO" branch), segment authentication program 300 maintains the first level of access to the device associated with the first segment of the FOV (step 360). Segment authentication program 300 returns to step 350 and monitors the received image frames from the smart contact lenses and proceeds to determine whether the device is viewed with a second segment of the FOV as described above.

For the case in which segment authentication program 300 determines that the device is viewed in a second segment of the FOV (step 350, "YES" branch), segment authentication program 300 authenticates with the device and provides a second level of access to the device associated with the second segment of the FOV (step 370). Segment authentication program 300 responds to the determination of the device as being viewed in the second segment of the FOV by authenticating with the device and providing an access level to the device which is associated with the device being viewed within the second segment of the FOV of the user. In some embodiments, the access level is associated with the computing device of the user hosting segment authentication program 300 and receiving image frames and augmented reality segment boundaries and three-dimensional object data associated with the FOV of the user, from the smart contact lenses worn by the user. Segment authentication program 300 establishes the access level with the device that is associated with the second segment of the FOV of the user in which the device is currently viewed and ends.

For example, segment authentication program 300 receives image frame data from camera 125 of smart contact lenses 120 and determines that IoT device 130 is now viewed in a different segment of FOV 140, based on the augmented segments from AR projector 127 of smart contact lenses 120. Segment authentication program 300 authenticates with the device and includes data indicating that IoT device 130 is now viewed in a second segment of FOV 140. Segment authentication program 300 provides a second level of access of client device 110 to IoT device 130, based on the viewing of IoT device 130 within the second segment of FOV 140.

Embodiments of the present invention recognize that changes to the access level of devices within the FOV of a user may serve to minimize bandwidth requirements, by removing authentication of devices as they are in a relative position outside the FOV of the user, or limit the access level of the user to the device based on the relative position of the device within a peripheral segment of the user's FOV. In some embodiments, administrator or higher privileged access to devices may be protected and inadvertent mistakes avoided, by limiting such access levels to specific regions of a user's FOV, such as a three-dimensional object or a near-distance narrow segment region of the FOV. In some embodiments, the access levels to a device, associated with a particular segment or region of a user's FOV, is pre-configured by a third-party administrator of a business or enterprise, and linked to authentication between the device the user interacts with and a computing device of a user, such as client device 110 (FIG. 1).

Figure 4:
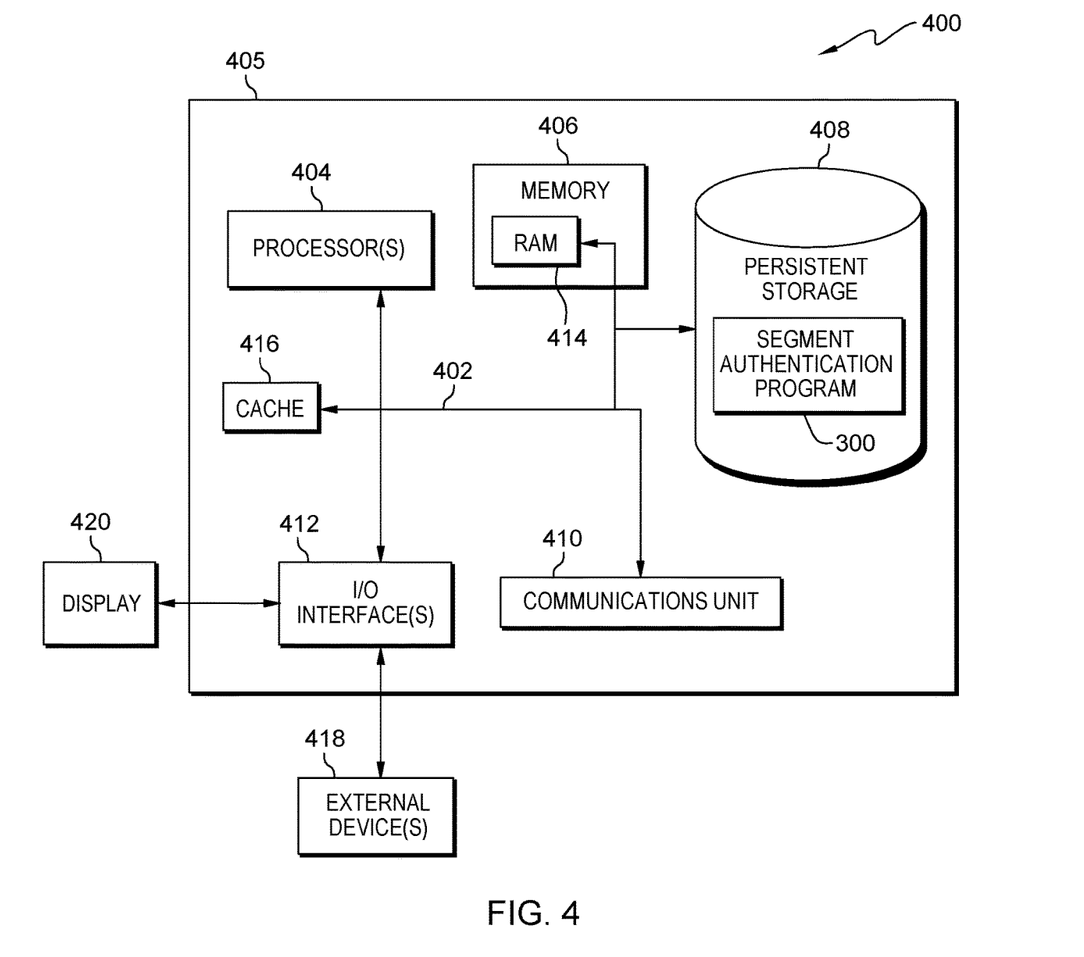
FIG. 4 depicts a block diagram of components of a computing system, including a computing device configured to operationally perform the segment authentication program of FIG. 3, in accordance with an embodiment of the present invention.

FIG. 4 depicts a block diagram of components of computing system 400, including computing device 405 configured to include or operationally connect to components depicted in FIG. 1, and with the capability to operationally perform segment authentication program 300 of FIG. 3, in accordance with an embodiment of the present invention.

Computing device 405 includes components and functional capability similar to components of client device 110, (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, an input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406, cache memory 416, and persistent storage 408 are computer-readable storage media. In this embodiment, memory 406 includes random access memory (RAM) 414. In general, memory 406 can include any suitable volatile or non-volatile computer-readable storage media.

In one embodiment, segment authentication program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Segment authentication program 300 may be downloaded to persistent storage 308 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., segment authentication program 300 can be stored on such portable computer-readable storage media and can be loaded onto persistent storage 408 via I/O interface(s) 412. I/O interface(s) 412 also connects to a display 420.

Display 420 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for authenticating a user to a device, the method comprising:

receiving, by one or more processors, a field of view (FOV) of a user, wherein the FOV is divided into a plurality of segments;

identifying, by the one or more processors, a device that is viewed within a first segment of the plurality of segments within the FOV, wherein the device is identified by performing object recognition techniques;

transmitting to the device, by the one or more processors, a key that includes credentials of the user that authenticates the user to the device that is viewed within the first segment of the FOV;

receiving, by the one or more processors, a first level of access to the device, based on the device being viewed within a first segment of the FOV; and determining, by the one or more processors, whether the device is viewed in a second segment of the FOV.

2. The method of claim 1, further comprising:

in response to determining the device as viewed in a second segment of the FOV, the one or more processors transmitting the key including the credentials of the user to the device; and receiving, by the one or more processors, a second level of access to the device, based on the device being viewed within the second segment of the FOV.

3. The method of claim 1, wherein the second segment is a subcomponent of the first segment of the FOV.

4. The method of claim 1, wherein an access to the device includes one or a combination of access levels selected from the group consisting of: read-only access, read-write access, operation of the device, access to an application included on the device, administrator privileges of the device, and no access to the device.

5. The method of claim 1, wherein the key transmitted to the device is predetermined and based on an access level associated with the device being viewed within a respective segment of the plurality of segments of the FOV.

6. The method of claim 1, wherein the FOV and plurality of segments of the FOV are generated by a camera and an augmented reality projector included in a smart contact lens, wirelessly connected to a mobile computing device communicatively connected to the smart contact lens.

7. The method of claim 5, wherein the plurality of segments and a level of access associated with the viewing of the device within a respective segment of the plurality of segments of the FOV are configured via the mobile computing device.

8. The method of claim 1, wherein a respective segment of the plurality of segments of the FOV includes an augmented reality of a three-dimensional region depicted as an overlay of the FOV.

9. The method of claim 1, wherein the FOV includes a common segment that enables authentication of multiple users simultaneously accessing the device.

10. The method of claim 1, wherein the device is an Internet of Things (IoT) device selected from the group consisting of: a smartphone, a smart watch, a smart TV, a voice assistant, a video assistant, a printer, a display, a smart lighting device, and a smart doorbell camera.

11. The method of claim 1, wherein a respective segment of the plurality of segments of the FOV includes a three-dimensional region associated with a predetermined level of access granted subsequent to successful authentication.

12. The method of claim 1, wherein the first level of access is associated with operation of an application installed on the device.

13. The method of claim 1, wherein the key transmitted to the device includes credentials of the user to authenticate with the device that is viewed within the first segment of the FOV.

14. A computer system for authenticating a user to a device, the computer system comprising:

one or more computer processors;

one or more computer-readable storage media;

program instructions stored on the one or more computer-readable storage media, the program instructions comprising:

program instructions to receive a field of view (FOV) of a user, wherein the FOV is divided into a plurality of segments;

program instructions to identify a device that is viewed within a first segment of the plurality of segments within the FOV, wherein the device is identified by performing object recognition techniques;

program instructions to transmit to the device a key that includes credentials of the user that authenticate the user to the device that is viewed within the first segment of the FOV;

program instructions to receive a first level of access to the device, based on the device being viewed within a first segment of the FOV; and program instructions to determine whether the device is viewed in a second segment of the FOV.

15. The computer system of claim 14, further comprising:

in response to determining the device as viewed in a second segment of the FOV, program instructions to transmit the key including the credentials of the user to the device; and program instructions to receive a second level of access to the device, based on the device being viewed within the second segment of the FOV.

16. The computer system of claim 14, wherein the FOV and plurality of segments of the FOV are captured by program instructions to generate images from a camera included in one or more smart contact lenses, wirelessly connected to a mobile computing device communicatively connected to the smart contact lens, and wherein the second segment is a subcomponent of the first segment of the FOV.

17. The computer system of claim 14, wherein the key transmitted to the device is predetermined and based on an access level associated with the viewing of the device within a respective segment of the plurality of segments of the FOV.

18. The computer system of claim 14, wherein a respective segment of the plurality of segments of the FOV of the smart contact lens includes an augmented reality of a three-dimensional region depicted as an overlay of the FOV.

19. The computer system of claim 14, wherein the FOV includes a common segment that enables authentication of multiple users simultaneously accessing the device.

20. A computer program product for authenticating a user to a device, the computer system comprising:

one or more computer-readable storage media;

program instructions stored on the one or more computer-readable storage media, the program instructions comprising:

program instructions to receive a field of view (FOV) of a user, wherein the FOF is divided into a plurality of segments;

program instructions to identify a device that is viewed within a first segment of the plurality of segments within the FOV, wherein the device is identified by performing object recognition techniques;

program instructions to transmit to the device a key that includes credentials of the user that authenticate the user to the device that is viewed within the first segment of the FOV;

program instructions to receive a first level of access to the device, based on the device being viewed within a first segment of the FOV; and program instructions to determine whether the device is viewed within a second segment of the FOV.

\* \* \* \* \*